July 15, 1969  A. T. CLASSEN  3,455,356
EGG BREAKING AND SEPARATING MACHINE
Filed Jan. 14, 1966  7 Sheets-Sheet 1

INVENTOR.
ALVIN T. CLASSEN
BY Norman M Hallam
ATTORNEY

July 15, 1969     A. T. CLASSEN     3,455,356
EGG BREAKING AND SEPARATING MACHINE
Filed Jan. 14, 1966     7 Sheets-Sheet 3

July 15, 1969　　　　A. T. CLASSEN　　　　3,455,356

EGG BREAKING AND SEPARATING MACHINE

Filed Jan. 14, 1966　　　　　　　　　　　　　　　7 Sheets-Sheet 4

INVENTOR.
ALVIN T. CLASSEN
BY Norman M Hallard
ATTORNEY

United States Patent Office 3,455,356
Patented July 15, 1969

3,455,356
EGG BREAKING AND SEPARATING MACHINE
Alvin T. Classen, Norfolk, Nebr., assignor to Henningsen Foods, Inc., New York, N.Y., a corporation of New York
Filed Jan. 14, 1966, Ser. No. 520,771
Int. Cl. H47j 43/14
U.S. Cl. 146—2                                                                  9 Claims

ABSTRACT OF THE DISCLOSURE

An egg breaking machine comprising a chain conveyor following a generally horizontal closed path and mounted on two sprockets of differing size for providing a moving support for a group of egg breaking heads with cooperating egg receiving and separating apparatus. The egg breaking heads comprise two pairs of cooperating U-shaped members having flat surfaces at their centers for gripping the eggs and with the upper U-shaped members being pivotally mounted to their operating arms. The egg receiving and separating apparatus for each breaking head is mounted on the chain with its breaking head and is in the form of an elongated pan having a yolk cup closing an aperture in its deep end. The various parts of the breaking and separating units are actuated by elongated stationary cam bars located along the path of travel of the breaking heads on the conveyor and the enlarged conveyor supporting sprocket is particularly advantageous as it acts to angularly separate the closely mounted heads and separating pans during the breaking and separating operations.

---

The present invention relates to a means for breaking eggs and more particularly to an egg breaker particularly adapted for performing a precise separation of the egg yolk and egg white at high speeds and in a continuous reliable operation.

A variety of automatic egg breaking machines have been proposed and some have been placed in commercial operation. Certain of these have been found to be satisfactory for relatively low speed breaking operations, however, these known machines have all proven unacceptable or inefficient when it has been attempted to increase the machine's output to the increasingly higher output levels desirable to provide the larger quantities of egg products now being used in an economically competitive and easily controlled egg breaking operation. It is also desirable to have a machine which will handle a wider range of egg sizes to permit a feeding of mixed egg sizes.

One of the principal failures encountered in simply increasing the operating speed of present egg breakers aside from an unintentional crushing of eggs is the loss in the ability of these machines to maintain a precise separation between the egg yolk and the egg white allowing too much of one product to become mixed with the other. Not only is it necessary for the machine to have the ability to make the precise separation but it is also necessary for the operation to be easily and closely supervised and for the various small adjustments to be easily and quickly made such as are always required in continuously operating machinery of this type.

Most prior machines perform the egg breaking operation by placing eggs in breaking units and by continuously moving these units over egg separating cups as each egg is broken. This general means is used in the present machine, however, a significant improvement has been made in the both individual breaking head and in the cooperating means for moving this head through its various operating positions so that a substantial and significant improvement in the overall machine efficiency results permitting higher speed operation, reduced contamination of the products one with the other or with egg shell, and an ability to handle wider variations in egg size. A reduction in the accidental or premature breaking or crushing of the eggs is also achieved even for eggs of differing sizes so that the loss from such improper egg breaking action is minimized and so that the preliminary egg sizing operations can be reduced or eliminated.

It has also been found possible to obtain these results and at the same time to arrange a group of egg cracking heads and separating cups and other elements so that all units are fully exposed and accessible at all times and particularly so that the critical breaking and dumping operations are performed immediately adjacent to a single machine operator.

Accordingly, an object of the present invention is to provide an automatic egg breaking machine of greatly improved efficiency and one capable of higher normal operating speeds than at present obtainable.

Another object of the present invention is to provide an automatic egg breaking machine providing more precise separation of the egg yolk and the egg white with a corresponding reduction in contamination of either product.

Another object of the present invention is to provide an egg breaking machine capable of handling a wider range of egg sizes.

Another object of the present invention is to provide an egg breaking machine having a simplified and accessible layout and particularly one in which the critical operations are performed immediately adjacent to a single operator.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein.

The egg breaking machine 1 has a series of individual egg cracking heads 2 each of which is carried through a series of loading, cracking, and dumping steps by head supporting and operating apparatus with each head receiving a single egg and where all of the heads pass through a succession of identical operating steps.

A general description of the machine and its operation will first be given based principally upon a description of an individual egg cracking head and its step-by-step movement through the egg cracking and dumping operations and the related yolk and white separating steps.

Figure 1:
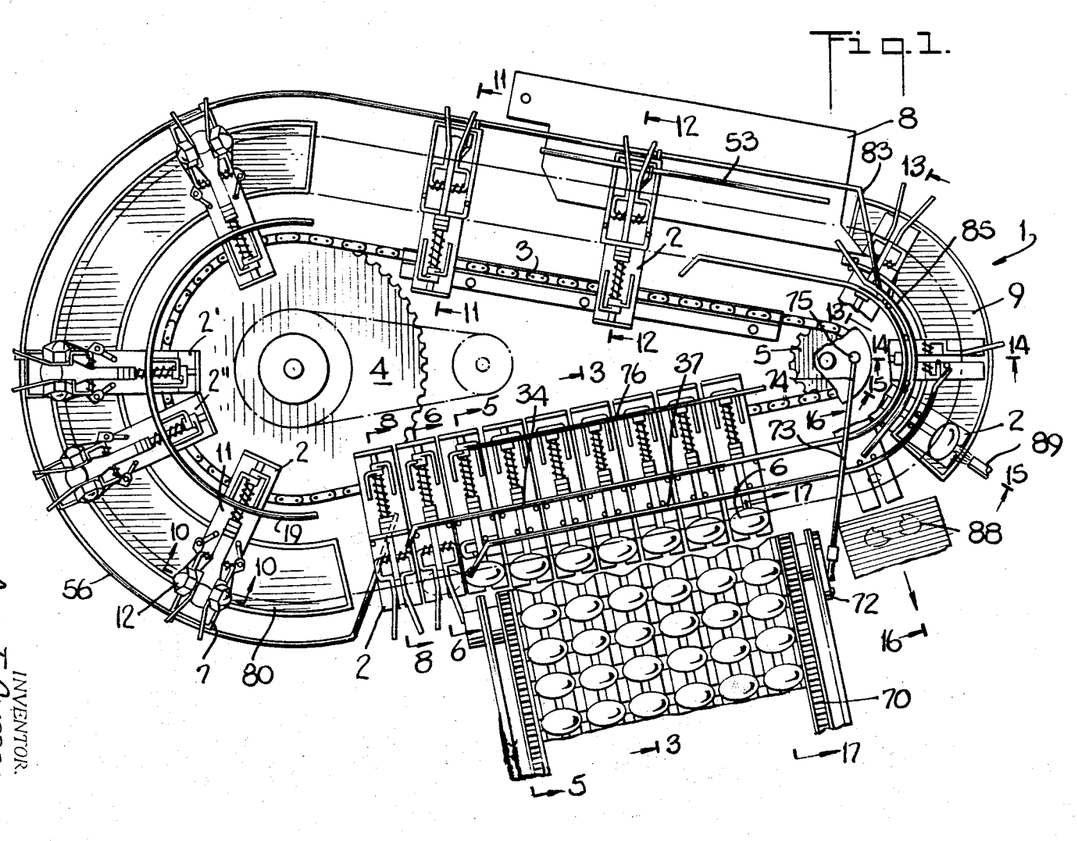
FIG. 1 is a top plan view of the machine with some egg breaking heads removed for clarity.

FIG. 1, which is a plan view of the overall egg cracking machine 1, shows a group of egg cracking heads 2 mounted on an endless chain 3 which carries the heads 2 around a closed path between the larger and smaller end sprockets 4 and 5. As each breaking head 2 makes one complete passage around the path on the chain 3 it receives an egg 6 and then breaks and dumps the egg 6 into an associated separating cup 7. The cup 7 first dumps the white into one receiving tray 8 and then drops the yolks into a separate yolk tray 9. After passing through cleaning and shell removal stations, the head 2 returns for a repeat cycle.

In order to facilitate a fuller description of the operation of the egg cracking heads at their various stations along the above described path, an individual cracking head and the associated separating cup will now be described including their several novel features which cooperate in the operating cycle to provide the improved machine operating results described above.

THE EGG CRACKING HEAD

Figures 2, 2A, 2B:
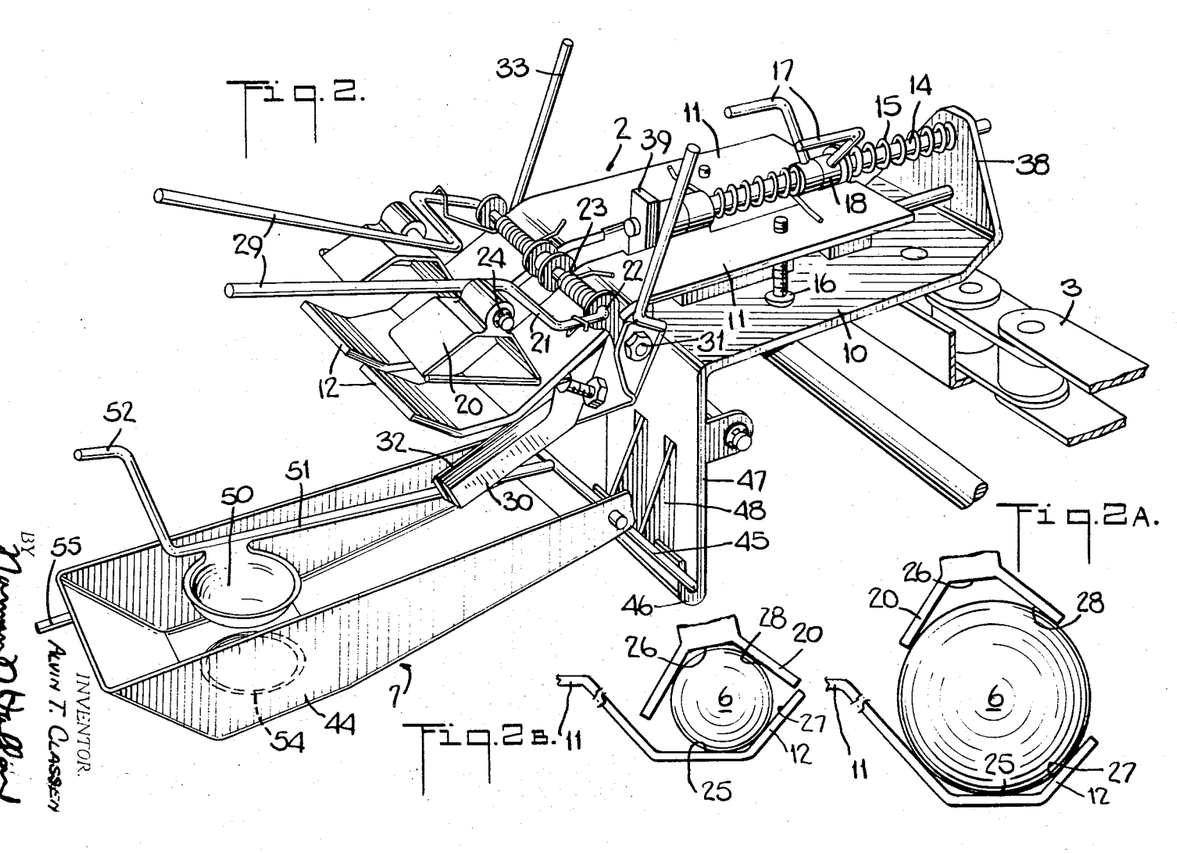
FIG. 2 is an enlarged perspective view of an egg breaking head and a related egg separating cup.
FIGS. 2a and 2b are diagrammatic views illustrating egg gripping for large and small eggs.

FIG. 2 is a perspective view illustrating a preferred embodiment of the improved egg cracking head 2 attached to a mounting plate 10 carried by the endless chain 3 and positioned above the cooperating egg separating cup 7 also removably attached to the mounting plate 10.

Figures 9, 10, 11:
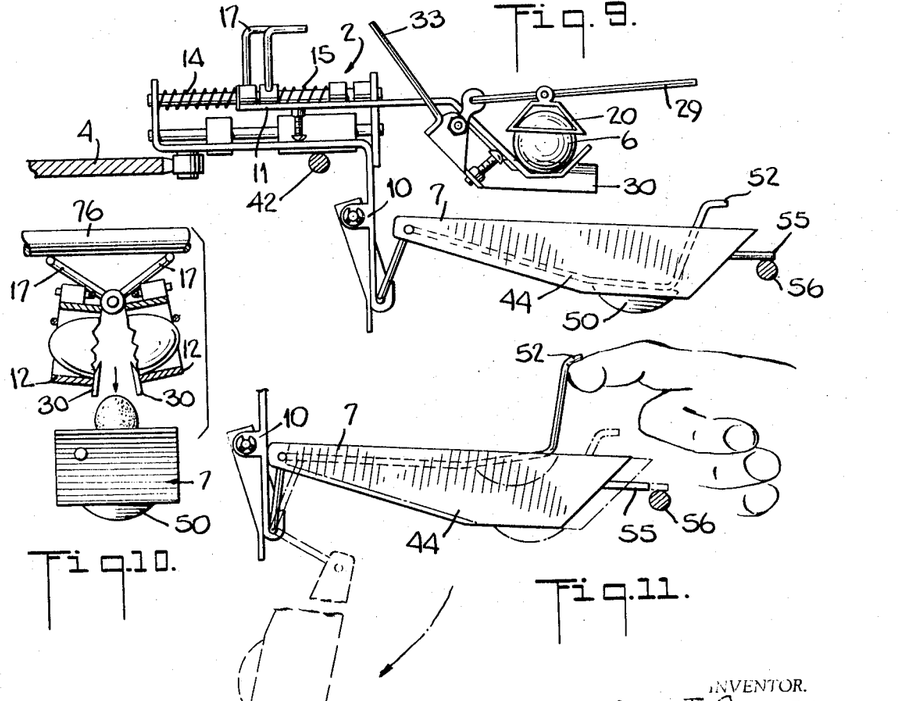
FIG. 9 is a sectional view of an egg cracking head corresponding to FIG. 8 with the head advanced to release the second egg cracking knife and to raise the egg separating cup to its egg separating position.
FIG. 10 is a detailed view illustrating the jaws of the egg cracking head in their shell draining position.
FIG. 11 is a sectional view taken along line 11—11 on FIG. 1 illustrating the egg separating cup at the operator inspection position permitting manual dumping of defective eggs.

The egg cracking head 2 comprises a pair of similar egg support arms 11 having end jaw portions 12. The inner adjacent edges of the two arms 11 are pivotally mounted on a common mounting pin 14 attached to the support plate 10 thus permitting the two jaw portions 12 to be swung away from one another in a subsequent egg dumping operation as, for example, to the open position illustrated in FIG. 10. Coil springs 15 mounted on the pin 14 engage each of the arms 11 to resiliently retain the jaw portions in their closed position as illustrated with the surfaces of the two jaw portions 12 in common planes and with the normally closed position of the jaw portions 12 being adjusted by stop screws 16. A cam follower rod 17 is attached to each of the arms 11, as for example, on the mounting bearing 18 and these rods 17 are positioned for sliding engagement with an elongated head opening cam or bar 19 at the egg dumping position as illustrated in FIGS. 1 and 10.

Figures 3, 4, 5, 6, 7:
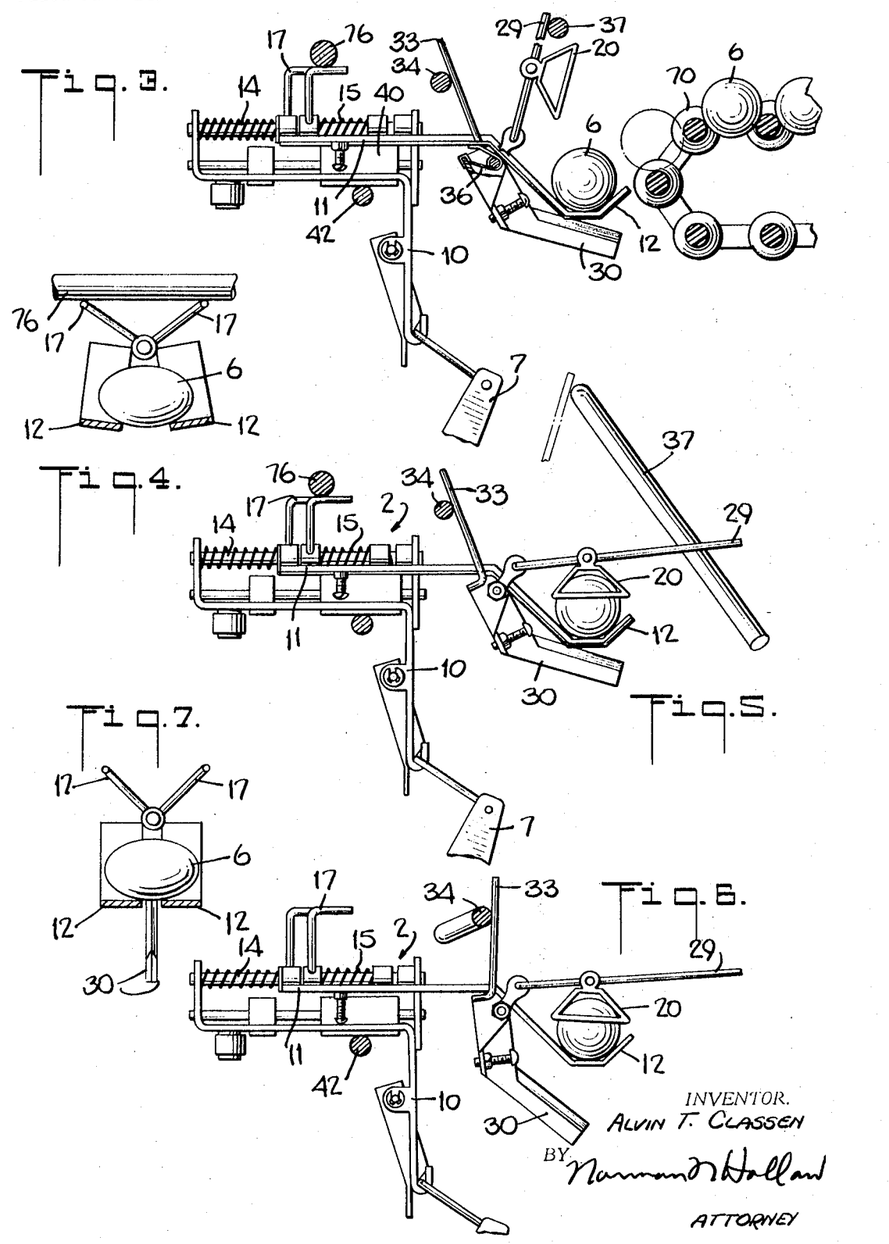
FIG. 3 is a sectional view taken along line 3—3 on FIG. 1 illustrating the egg loading operation.
FIG. 4 is a detailed view of the control cam showing the position of the egg gripping jaws at the egg loading station.
FIG. 5 is a sectional view taken along line 5—5 on FIG. 1 illustrating the egg breaking head closing to its egg gripping position.
FIG. 6 is a sectional view taken along line 6—6 on FIG. 1 showing the egg cracking knives in their cocked position.
FIG. 7 is a detailed view showing the position of the egg gripping jaws and corresponding to FIG. 6.

As illustrated in FIGS. 2 and 3 an egg hold-down lid 20 is pivotally mounted on each jaw 12 on a mounting rod 21 having one end 22 pivotally connected to the arm 11. A coil spring 23 resiliently urges each of the hold-down lids 20 into engagement with an egg supported on the jaw portions 12 of the arms 11. The hold-down lids 20 have a U-shaped cross-section generally complementary to the U-shaped jaw portions 12 on the arms 11 to efficiently hold eggs of varying sizes. Each of the jaw hold-down lids 20 is preferably pivotally mounted on its mounting rod 21 at 24 to facilitate the contact between the lid 20 and the egg surface. Drawings 2a and 2b illustrate an egg 6 gripped between the lids 20 and the jaw portions 12 for an egg of maximum size in FIG. 2a and an egg of minimum size in FIG. 2b. It is seen that the straight and angularly related sides of these members normally assure four points or lines of contact with eggs 6 within the normal range of egg diameters, i.e., eggs between 1⅛ and 1⅞ inches. This four-point contact is facilitated by the use of the double hinged mounting for the hold-down lid 20 as described above and by the shaping and proportioning of both the jaw portion 12 and the hold-down lid 20 including their angularly related and generally straight individual sections. In a preferred embodiment of a cracking head for gripping eggs of varying sizes and in normal observed range of egg sizes of from 1⅛ to 1⅞ inches, the center portions of the jaw and the hold-down lids 25 and 26, respectively, are approximately ⅝ to ¾ inch and the side members 27 and 28 flare out at about a 45 degree angle.

The mounting rods 21 for each of the hold-down lids 20 extend outwardly beyond the hinges 24 to form a cam follower rod portion 29 to permit the lids 20 to be lifted clear of the jaws 12 by cam rod 37 as illustrated for example, in FIG. 3. A pair of egg cutting knives 30 are pivotally mounted at 31 one on each of the arms 11. The knives 30 have cutting edges 32 proportioned for movement between an egg cutting position as illustrated in FIGS. 9 and 10 and an open position spaced from the gripped egg 6 as illustrated in FIG. 3. The movement of each knife 30 is controlled by a cam rod 33 extending beyond the end of each knife 30 for engagement with a knife bar cam 34. Adjustable stops 35 on each knife 30, control the distance the knives 30 penetrate into the eggs under the force of the knife activating springs best illustrated at 36 in FIG. 3. As will be further described below, the knives 30 are released by the knife control cam 34 to crack the egg as the head 2 carries the egg through the initial portion of its travel.

The above described preferred shape of the hold-down lid 20 cooperates with the knife action to insure a knife penetration into each egg of uniform distance since each egg no matter what its size is seen to rest firmly against the flat center portion 25 of the jaw 12. The above described arms 11 with their associated knives 30 and hold-down lids 20 are easily removed from the support plate 10 by sliding the mounting pin 14 inwardly of the machine against the force of one coil spring 14 thereby successively releasing the opposite ends of the pin 14 from the pivot pin mounting flanges 38 and 39 on the support plate 10.

The operation of the above described elements of each cracking head 2 will be further described below in the description of egg breaking operation.

The preferred embodiment of the cracking head includes an additional support means for the cracking head support plate 10 including a support wheel 40 rotatably mounted on an axle 41 and positioned to ride on an elongated support rod 42.

THE EGG SEPARATING CUP

A separate egg separating cup 7 is mounted beneath each egg cracking head 2. These cups 7 receive the liquid egg white and egg yolk as they drain from the cracked eggs in the cracking heads 2 and thereafter separate the egg white and the egg yolk by draining them into separate pans. When desired, adjustments to the control cams are made to eliminate the separating operation so that the pans drain both the egg yolk and white simultaneously where a whole egg product is desired.

As best illustrated in FIGS. 2 and 9, each egg cup 7 includes an egg white pan 44 pivotally attached to the same mounting plate 10 as the egg cracking head 2 by means of a generally U-shaped hinge pin 45. The central portion of the hinge pin 45 releasably held in a hook 46 formed on the lower leg 47 of the mounting plate 10 and positioned adjacent to latch 48 releasably held in locking position above the hinge pin 45. The cups 7 are thus removed for replacement or cleaning by pressing the latch 48 clear of the hinge pin 45 against the force of a suitable latch pin spring permitting the hinge pin 45 to be lifted out of the hook 46. The yolk separating portion of the cup 7 comprises a yolk cup 50 attached to an elongated mounting rod 51 connected to the hinge pin 45 and having an outer cam follower rod 52 which is lifted by a separator bar 53 (FIGS. 1 and 12) during the egg white draining operation described below. The yolk cup 50 normally rests in and seals off an egg white draining aperture 54 in the bottom of the egg white pan 44 except when it is lifted clear of the aperture 54 by the separator bar 53 engaging the follower rod 52 during the egg white draining period.

The position of the separator cup 7 is controlled by cam follower rod 55 on the edge of the pan 44 which moves on and off an elongated cup guide bar 56 (FIGS. 1 and 9).

To facilitate the seating of the eggs into the cracking head 2 during loading, the two jaws 12 are swung apart slightly to cradle the eggs as shown in FIG. 4. This slight jaw opening is provided by the engagement of the jaw follower rods 17 with the cradle bar 76 (FIGS. 1 and 3).

THE EGG BREAKING OPERATION

The operation of the egg cracking heads 2 and separating cups 7 as they are moved around their closed paths during the egg cracking operation will now be described including a description of the related machine support and drive elements and the operation of these elements as they cooperate in the egg cracking or breaking and separating steps.

Figures 18, 18A:
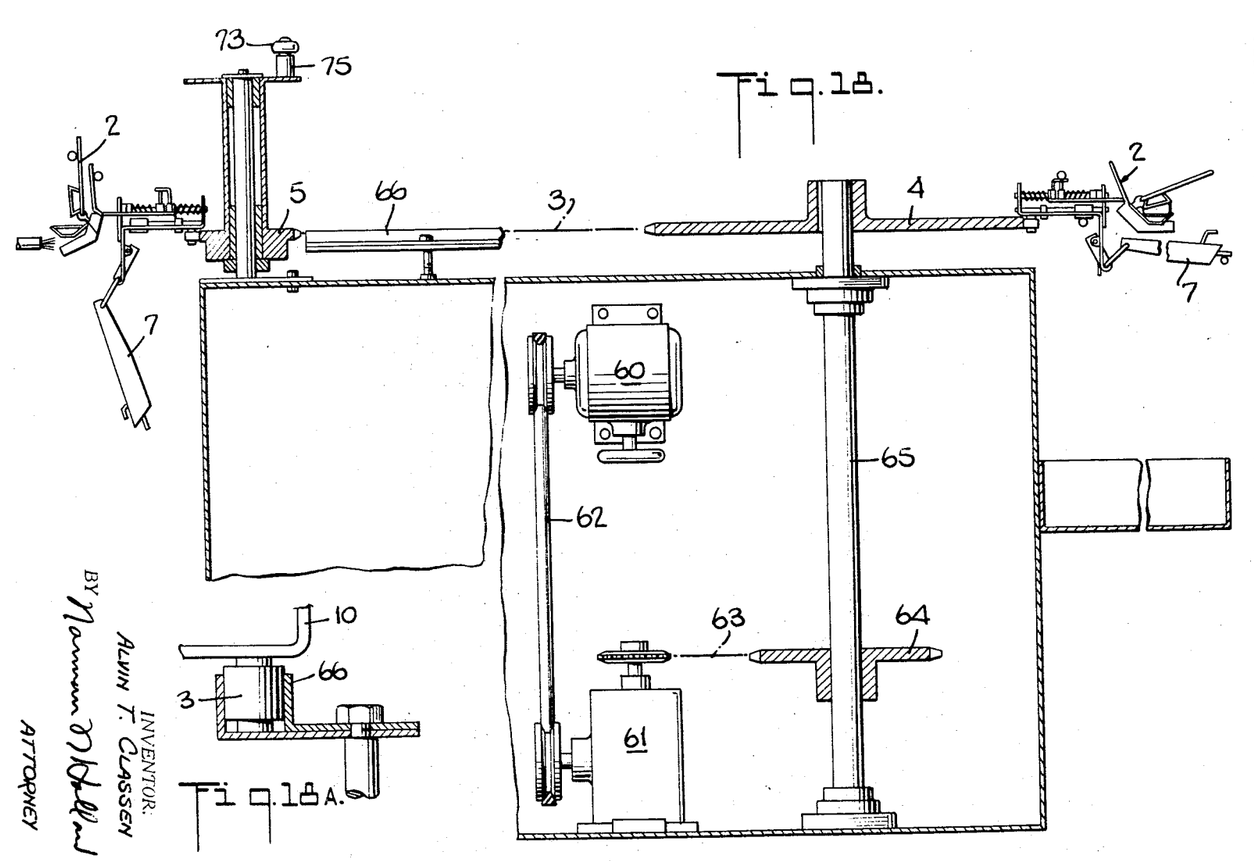
FIG. 18 is a vertical sectional view of the machine showing the machine drive.
FIG. 18A is an enlarged sectional view of the chain support channel.

FIG. 18 which is a vertical section of the egg breaking machine 1, illustrates the machine drive including an adjustable drive speed motor 60 and a speed reduction drive box 61 connecting the drive motor to the belt drive sprocket 4 through a suitable drive system including belt 62, chain 63, sprocket 64 and vertical drive shaft 65. The drive motor 60 speed is set to provide for a continuous rotation of the sprockets 4 and the interconnected breaking head support chain 3 which carries the breaking heads 2 continuously around their closed paths above similarly moved breaking cups 7. A guide and support channel 66 is preferably positioned beneath the runs of the chain 3 between the sprockets 4 and 5 (FIGS. 18 and 18a).

The first step in the process is the loading step wherein a series of heads 2 such as the 6 breaking heads as illustrated in FIG. 1 are simultaneously opened and supplied with an egg 6 from a roller-type egg conveyor 70 as illustrated. As the six breaking heads 2 are moved into the loading position by the chain 3, the loading cam bar 37 lifts the egg hold-down lids 20 away from the jaws 12 by engaging the cam follower rods 29 on the hold-down lids 20 and swinging the lids 20 clear of the jaws 12 as illustrated in FIG. 3.

The smaller chain support sprocket 5 is proportioned to make one revolution to correspond to each advance of six egg breaking heads 2 into the loading position. The advance of the egg conveyor 70 is synchronized with the movement of the cracking heads 2 by causing the conveyor 70 to advance and release one row of eggs to the heads 2 by the movement of a ratchet 72 driven by the crank 73 having its opposite end 74 pivotally connected at 75 to the sprocket 5. The ratchet crank 73 is moved one cycle each time that a group of heads 2 advance to the loading station with the timing set to advance the eggs as the group of heads 2 reaches the loading position illustrated in FIGS. 1 and 3.

During the egg loading, the cracking knives 30 are swung clear of jaws 12 by the knife bar 34.

Figure 8:
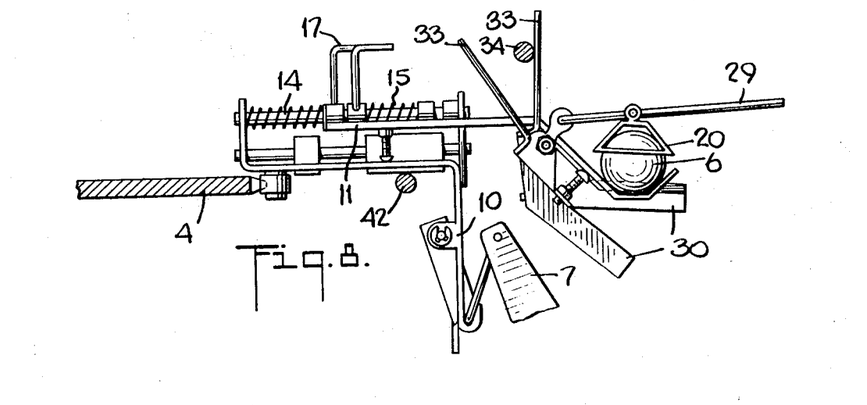
FIG. 8 is a sectional view taken along line 8—8 on FIG. 1 illustrating the first egg cracking knife in engagement with an egg.

After each cracking head 2 is loaded with an egg 6, it its advanced by the chain 3 and the lid bar 37 closes the lids 20 as illustrated in FIG. 5. A slight additional advance of the egg cracking head 2 results in the cracking knives 30 being swung further away from the egg 6 by the knife bar 34 as shown in FIG 6 preparatory to the actual cracking operation which occurs as the cam rods 33 on the knives 30 successively pass off of the knife bar 34 and penetrate sharply into the egg 6 as shown in FIG 8 with the front knife 30 being released prior to the rear knife since it reaches the release point on bar 34 first resulting in a preferred sequential operation (FIGS. 8 and 9) of the two cracking knives 30.

As seen in FIG. 1 the cracking head 2 now moves over a drip pan 80 while the separator cup 7 is lifted to a generally horizontal position by the engagement of its follower rod 55 with the cup guide bar 56 (FIG. 9). The cracking head 2 opening bar 19 now engages the two follower rods 17 on the cracking head arms 11 causing the arms 11 to swing away from one another to complete the cracking and opening of the egg 6 as illustrated in FIG. 10 and permitting the egg yolk and egg white 81 to drain into the separator cup 7 with the yolk flowing into the yolk cup 54 with the egg white flowing around the yolk onto the adjacent surface of the separator pan 44. As seen in FIG. 1, the head opening bar 19 and the cup guide bar 56 continue for approximately 180 degrees of sprocket 4 travel permitting the draining to continue during the time period required for each cracking head 2 to move around this portion of the larger sprocket 4.

On FIG. 1 a number of the cracking heads 2 have been removed for clarity, however, two adjacent cracking heads 2 are illustrated at 2' and 2" as they move around the larger sprocket 4. It is seen that the relatively large radius of the sprocket 4 results in an angular separation of the adjacent cracking heads 2' and 2" providing increased spacing between them which permits the cracking heads to swing open to their dumping position during their travel around the relatively large sprocket 4 and at the same time permitting the heads 2 to be closely spaced on the straight portions of the chain 3, as for example, at the egg loading station. This arrangement permits a relatively large number of heads 2 to be efficiently mounted on the chain 3 with close spacing and provides spacing when necessary for the dumping operation.

As each cracking head 2 moves beyond the head opening bar 19 with the separator cup still held horizontally by the cup guide bar 56, the head 2 passes the operator position where the contents of the cup are observed by the operator and where the cup is dumped into a mixed egg pan in the event the yolk or white are mixed together. In order to dump the entire separating cup 7, the operator moves the cup 7 clear of the cup guide bar 56 as illustrated in FIG. 11. This is conveniently done by swinging the yolk cup cam follower rod 52 upwardly so that the hinge pin 45 for the pan 44 which is attached to the egg cup support rod 51 swings in a counterclockwise direction as shown in FIG. 11 causing the separator cup follower rod 55 to back off of the cup guide bar 56. The separator cup 7 now falls to a generally vertical position as illustrated in dash-dot lines dumping the egg yolk and white into a suitable receptacle. This dumped separator cup 7 remains in its dropped position until it is washed and again raised after the egg loading for the next cycle.

If the operator finds the yolk or white to be contaminated, the separator cup 7 is removed.

Figure 12:
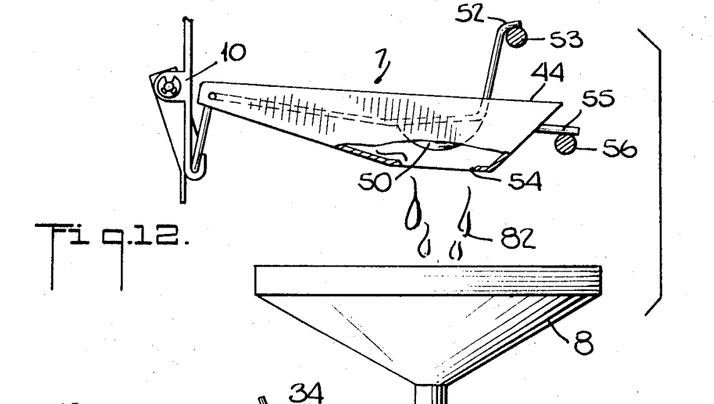
FIG. 12 is a sectional view taken along line 12—12 on FIG. 1 illustrating the egg white draining from the separating cup.

The moving cracking heads 2 now enter the white separating zone. This separation results from a lifting of the yolk cup 50 by the engagement of the yolk cup follower rod 52 with the separator bar 53 as illustrated in FIG. 12 causing the egg white to drain through the circular aperture 54 at the bottom of the separator pan 44 which has been opened by the lifting of the egg cup 50. This draining into the egg white collecting pan 8 continues as the cracking head 2 is moved along the relatively long separator bar 53 path to assure the complete drainage of the egg white 82.

Figure 13:
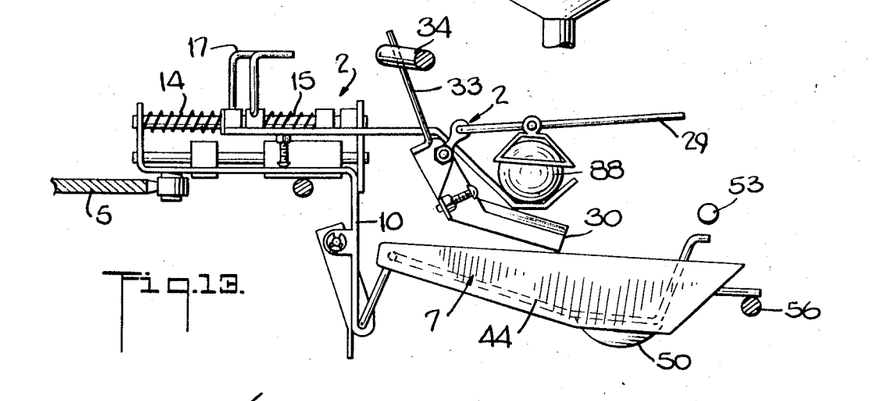
FIG. 13 is a sectional view taken along line 13—13 on FIG. 1 illustrating the end of the egg white draining step.
Figure 14:
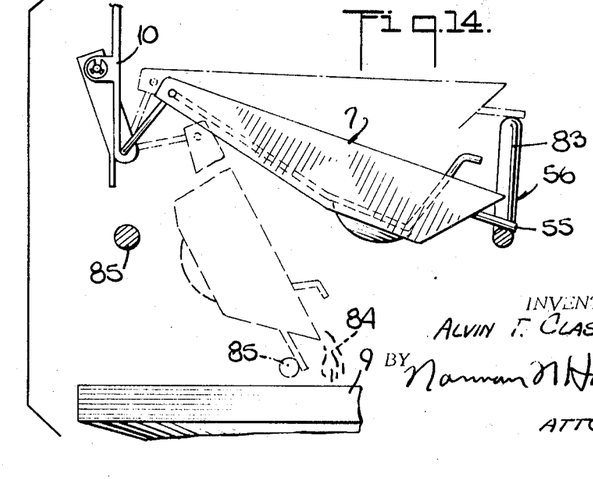
FIG. 14 is a sectional view taken along line 14—14 on FIG. 1 illustrating the yolk draining operation.

Thereafter the separator bar 53 ends causing the egg cup 50 to drop sharply back into the aperture 54 as illustrated in FIG. 13 in a manner which recloses the aperture 54. The yolk 84 is next dumped into the yolk receptacle 9 by an inclined end portion 83 on the cup guide bar 56 which tilts the entire separator cup 7 and which permits the yolk 84 to drain over the edge of the tilted cup as illustrated in FIG. 14. A washer guide bar 85 is engaged by the follower rod 55 on the separator cup 7 to prevent the separator cup 7 from swinging down to the same vertical position occupied by the separator cups 7 prematurely dumped by the operator as described above. This washer guide bar 85 acts as a guide track to direct the moving separator cups 7 away from a pan washer as the separator cups 7 are carried on through the completion of their cycle and back to the egg loading position. The separator cups 7 dropped by the operator remain behind the washer guide bar 85 in a position which causes them to enter the washer 86 located under the egg feeding position and including pan washing sprays 87 which remove any egg white or yolk from the dumped cups 7 as they move through the washer 86 towards the beginning of another cycle.

Figures 15, 16, 17:
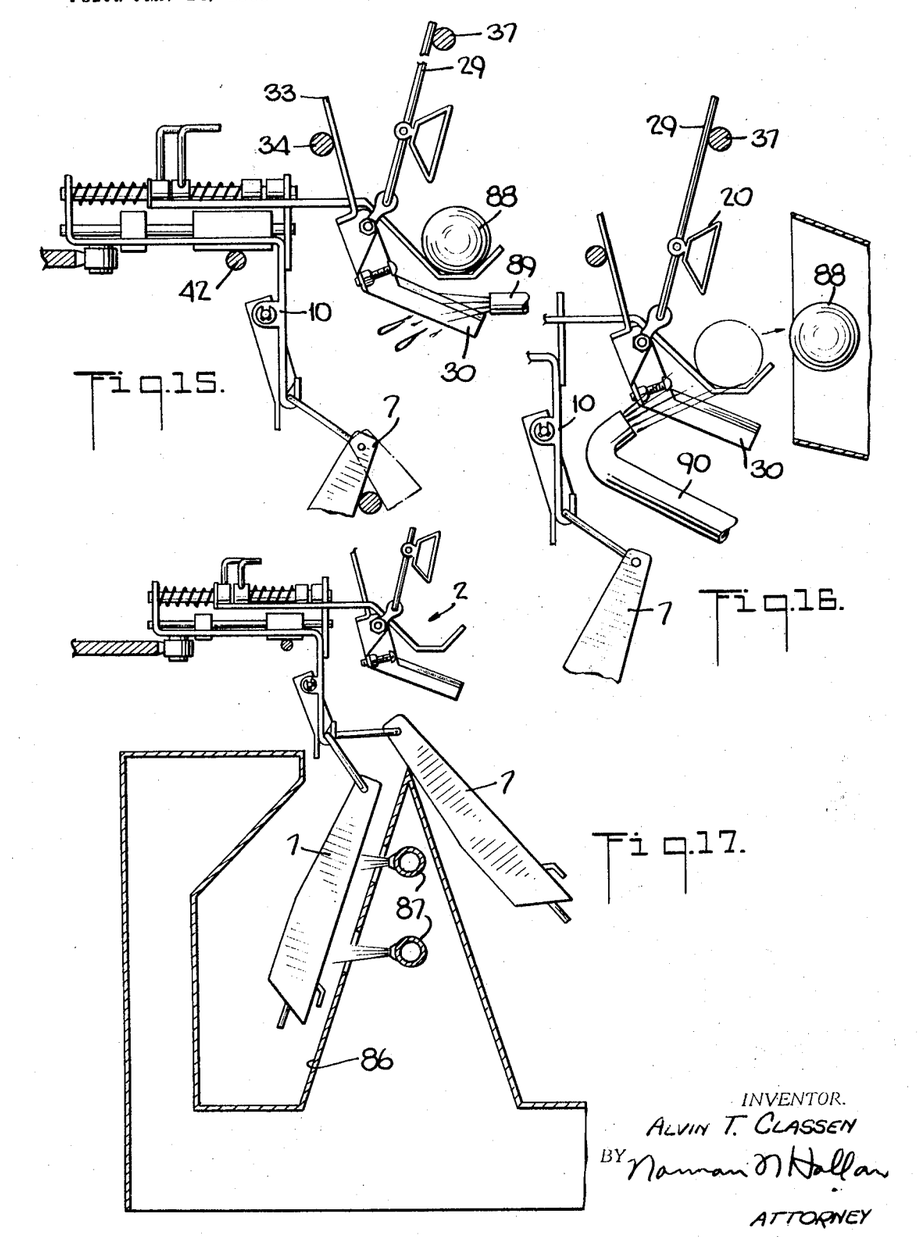
FIG. 15 is a sectional view taken along line 15—15 on FIG. 1 illustrating the knife cleaning operation.
FIG. 16 is a sectional view taken along line 16—16 on FIG. 1 illustrating the shell removal operation.
FIG. 17 is a sectional view taken along line 17—17 on FIG. 1 showing the separating cup washer.

During the yolk draining period and while the cracking heads 2 are moving along above the yolk collecting pan 9, the follower rods 33 on the knives 30 are re-engaged by the knife bar 34 causing the knives 30 to be withdrawn from the empty egg shells 88 as illustrated in FIG. 13. The follower rods 29 on the egg gripping lids 20 now engage the initial portion of the lid bar 37 which raises the lids 20 as shown in FIGS. 15 and 16. The knives 30 have been swung clear of the egg shells 88 by the knife cam 34 and the knives 30 are cleaned by an air nozzle 89 which blows any liquid clinging to the knives into a suitable receptacle. Thereafter and as illustrated in FIG. 16, the empty shells 88 are blown clear from the open cracking head 2 is now ready for reloading and the commencement of another cycle with the knives 30 swung clear of the egg supporting jaw portions 12 and with the lids 20 held open by the lid bar 37. When the empty cracking head 2 reaches a predetermined position adjacent one of the rows of eggs 6 on the egg conveyor 70, the synchronized conveyor advancing ratchet 72 again drops an egg 6 from the end of that row into the cracker head 2 and the above described cycle is repeated.

It will be seen that an improved egg cracking or breaking machine has been provided which is capable of a high speed precise cracking operation and which at the same time provides for improved operation and control of the cracking heads and for simplified adjustment, maintenance, and observation of the operation of each of the individual cracking heads.

The machine is particularly adapted for a simplified control and surveillance by a single operator by its improved egg cracking head design and by the improved and exposed cracking head support, drive, and operating members including the several automatic manipulations of the cracking head and the associated separation cups.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. An egg breaking machine comprising the combination of spaced sprockets, an endless chain mounted on said sprockets and lying in a generally horizontal plane and having straight and arcuate portions in the path of the chain, a plurality of egg cracking heads each having an inner end connected to said chain for movement therewith, means for simultaneously placing eggs in a plurality of said cracking heads while said heads are on a straight portion of the chain paths, said cracking heads including means for cracking and opening eggs, an egg separator cup positioned beneath each cracking head for receiving the liquid egg from eggs cracked by said heads, means mounting each separator cup on said chain beneath a cracking head for movement with the cracking head, said separator cups including means for separating the liquid egg white from the liquid egg yolk, and means for operating said cracking head egg opening means positioned adjacent said arcuate portion of the chain paths whereby adjacent cracking heads are angularly positioned providing additional spacing therebetween for the egg opening operation.

2. The machine as claimed in claim 1 in which the separating means in the separator cups comprises the combination of a liquid holding pan having an aperture in its lower surface, a yolk cup movably connected to said pan and positioned to move from a closed position sealing said aperture to an open position spaced from said aperture, and said yolk cup being proportioned to accommodate one liquid egg yolk.

3. The machine as claimed in claim 1 in which said means for operating said cracking head comprises an elongated cam, and a cam follower on said cracking head.

4. The machine as claimed in claim 1 in which said cracking heads and said separator cups are removably mounted on said chain.

5. The machine as claimed in claim 1 in which said egg cracking heads comprise two pairs of pivotally connected egg gripping members with opposed egg gripping portions on each pair of members for gripping opposite ends of an egg, each of said gripping portions including a flat egg engaging surface positioned whereby opposed flat portions in each pair of members engage opposite surfaces of an egg and are generally parallel to one another.

6. The machine as claimed in claim 1 in which said egg cracking heads comprise two pairs of pivotally connected egg gripping members with opposed egg gripping portions on each pair of members for gripping opposite ends of an egg, each of said gripping portions including a flat egg engaging surface positioned whereby opposed flat portions in each pair of members engage opposite surfaces of an egg and are generally parallel to one another, said egg cracking means including a knife pivotally mounted on each pair of members, and the pivotal connection for said knife on one pair of members having a fixed position with respect to one flat surface on that pair of members, and the pivotal connection for said other knife on said other pair of members having a fixed position with respect to the flat surface on said other pair of members corresponding to said one flat surface.

7. The machine as claimed in claim 1 which further comprises means for selectively dumping the separator cups under the control of an operator, and means for selecting for washing those cups which have been dumped.

8. An egg breaking machine comprising the combination of spaced sprockets, an endless chain mounted on said sprockets and lying in a generally horizontal plane and having straight and arcuate portions in the paths of the chain, a plurality of egg cracking heads each having an inner end connected to said chain for movement therewith, means for simultaneously placing eggs in a plurality of said cracking heads while said heads are on a straight portion of the chain paths, said cracking heads including knife means for cracking and opening eggs, an egg separator cup positioned beneath each cracking head for receiving the liquid egg from eggs cracked by said heads, means mounting each separator cup on said chain beneath a cracking head for movement with the cracking head, said separator cups including a yolk cup for separating the liquid egg white from the liquid egg yolk, means for operating said cracking head egg opening means positioned adjacent said arcuate portion of the chain paths, means for washing separator cups positioned adjacent to the paths of said separator cups, and means for selectively dumping said separator cups under the control of an operator.

9. The machine as claimed in claim 8 in which said washing means includes means for selecting for washing those separator cups dumped by the operator.

References Cited
UNITED STATES PATENTS

| | | | |
|---|---|---|---|
| 2,966,184 | 12/1960 | Willsey | 146—2 |
| 3,058,501 | 10/1962 | Kirkland | 146—2 |
| 3,142,322 | 7/1964 | Shelton et al. | 146—2 |
| 3,190,328 | 6/1965 | Twedt et al. | 146—2 |

W. GRAYDON ABERCROMBIE, Primary Examiner